Inventor:
Lewis I. Mendelsohn,
by Harry E. Dunham
His Attorney.

July 4, 1944. L. I. MENDELSOHN 2,352,965
METER LIGHT LOAD ADJUSTMENT
Filed June 11, 1943 2 Sheets-Sheet 2
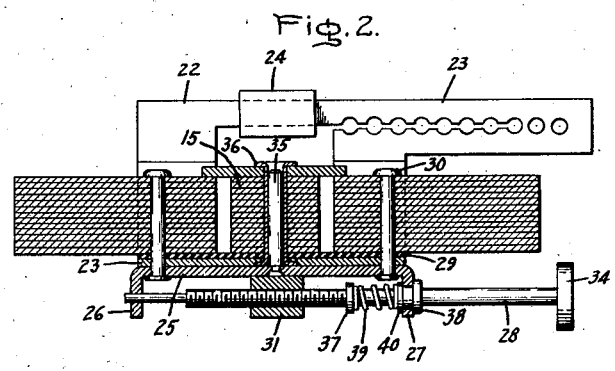
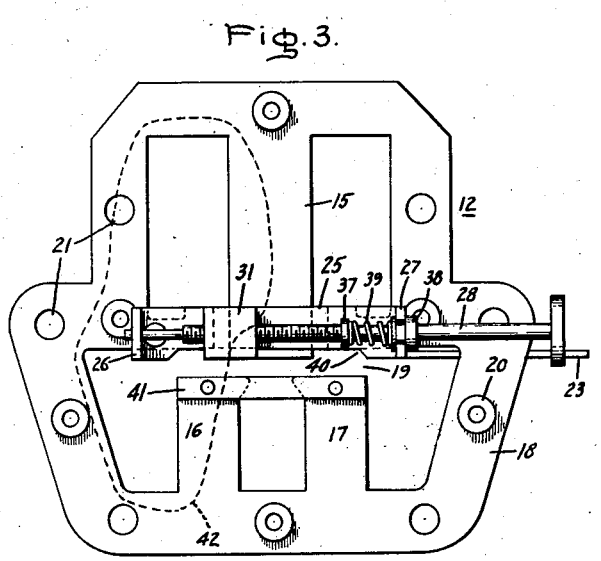 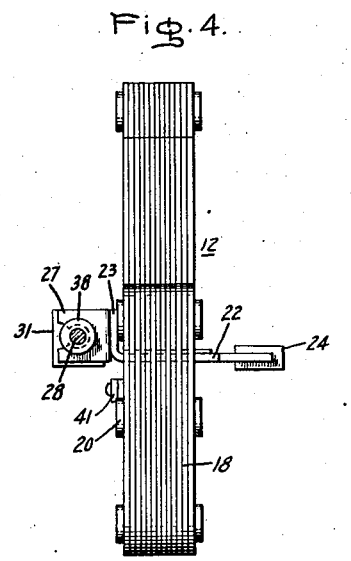
Inventor:
Lewis I. Mendelsohn,
by Harry E. Dunham
His Attorney.

Patented July 4, 1944

2,352,965

UNITED STATES PATENT OFFICE 2,352,965

METER LIGHT LOAD ADJUSTMENT

Lewis I. Mendelsohn, Lynn, Mass., assignor to General Electric Company, a corporation of New York Application June 11, 1943, Serial No. 490,464

4 Claims. (Cl. 171—264)

My invention relates to a light load adjustment feature for induction meters, and its object is to provide a light load adjustment for such meters of such rigidity that it cannot get out of adjustment accidentally, and one which increases the useful flux of the meter. In carrying my invention into effect, I provide what amounts to an auxiliary potential flux pole piece secured in adjustable fixed relation to the potential magnet adjacent to the meter armature and movable between positions where the flux of such auxiliary pole piece may add to or subtract from the main driving meter torque.

Figure 1:
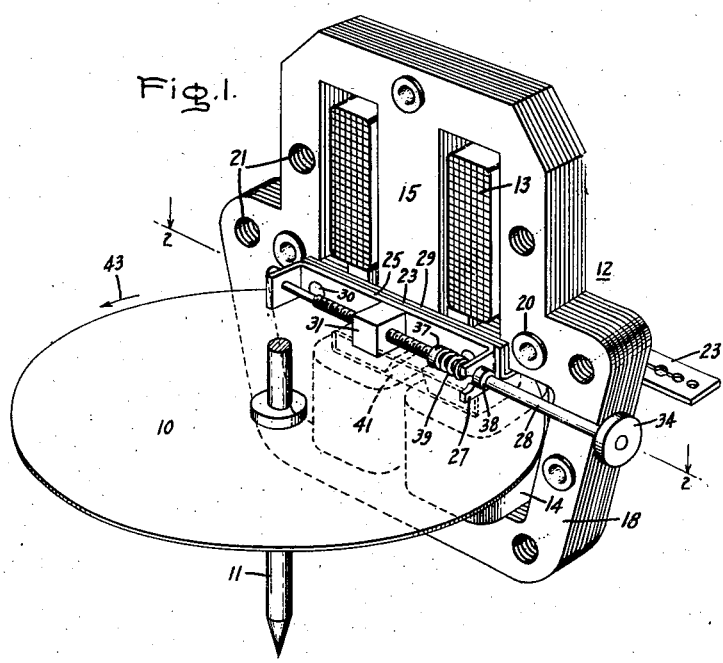
Figure 5:
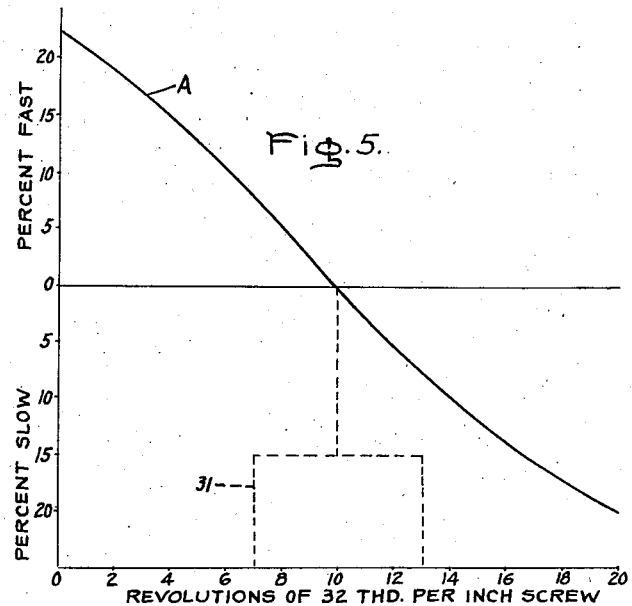

The features of my invention which are believed to be novel and patentable will be pointed out in the claims appended hereto. For a better understanding of my invention, reference is made in the following description to the accompanying drawings in which Fig. 1 is a front perspective view of an induction wattmeter driving element equipped with my light load adjustment. Fig. 2 is a sectional view through the potential magnet parallel to the meter disk with my light load adjustment secured thereto, showing the manner of attachment and also including a lag adjustment of the meter with which my light load adjustment is preferably combined. Figs. 3 and 4 are front and side views of the meter magnetic circuit for the purpose of illustrating the light load adjustment flux path; and Fig. 5 shows by way of a curve the magnitude and variation of the light load torque over the adjustment range.

Referring to Fig. 1, 10 represents a disk rotor of conducting material, such as copper as aluminum, mounted for rotation with a shaft 11. This disk is driven by induction motor action by a meter driving element having a magnetic circuit structure 12 energized jointly by a voltage coil 13 and a current winding 14, the latter being divided into two coils. The core structure for the voltage magnet is essentially E-shaped with the voltage coil on the middle leg 15. The current magnet is U-shaped with the current winding divided on the two legs 16 and 17 best shown in Fig. 3. These electromagnets are magnetically joined by an outer return flux yoke 18 extending from the base of the U-shaped current core to the outer ends of the E-shaped voltage core. The core structure is of laminated magnetic material and the laminations may be stamped in one piece. The open ends of the two magnets face each other and are separated by an air gap 19 in which the disk armature 10 is rotatively mounted so as to be driven by the joint action of the current and voltage fluxes. The laminations are held together by rivets 20 and by bolts (not shown) which pass through openings 21 and which also serve to bolt the meter to supporting structure (not shown).

In this type of meter the voltage coil has many turns and is of high inductance, and produces a flux which in a watthour meter lags the current flux by approximately 90 degrees when the current and voltage of the circuit metered are in phase. To obtain exactly this desired 90-degree phase relation, a lag coil is used. Such lag coil is shown at 22. It is of conducting material, has a turned-up edge 23 at the front, extends parallel with and above the meter armature through the armature air gap, and has an adjustable portion 23 at the rear by means of which the resistance of the lag plate may be adjusted. Included in the circuit of the lag coil, is a member 24 made of magnetic material having a negative temperature coefficient of permeability for compensating for temperature variation. This type of lag coil is described in copending application Serial No. 446,867, filed June 13, 1942, by Harold E. Trekell and assigned to the same assignee as the present invention.

Light load adjustment

Rigidly clamped to the side of the voltage electromagnet adjacent and parallel to the air gap and centered laterally with respect to the central leg 15 of the voltage magnet is a cold rolled steel U-shaped strap 25 having its end legs turned out at 26 and 27 to form bearings for a threaded rod 28 the axis of which lies parallel to the strap 25. The turned-up edge of the lag plate is clamped between the yoke of the strap 25 and the side of the voltage magnet, and I may include an additional spacer strip 29 of conducting material between the strap 25 and magnet, which spacer strip may be on either side of the turned-up edge of lag plate 23 but is shown on the magnet side in Fig. 2. These parts are rigidly clamped to the magnet by rivets 30 as best shown in Fig. 2. Threaded on rod 28 is a block 31 of magnetic material which has sliding contact along the face of strap 25 when the rod 28 is turned. This adjusts the auxiliary block in a direction tangent to a radius of the disk 10. In order to assure tight contact between the block nut 31 and the face of strap 25, the rod 28 may be sprung outwardly very slightly between its bearings by the nut. It is now seen that when the rod 28 is turned by head 34, the nut may be slid along the face of the voltage magnet adjacent the air gap either way from the central position shown in Fig. 2.

This arrangement constitutes the light load adjustment of the meter. The nut is in effect an auxiliary voltage flux pole piece the position of which is adjustable. In order to bring flux out from the central pole piece 15 of the voltage magnet to strap 25 and nut 31, I have porvided a part 35 of magnetic material extending into a tubular rivet 36 from the inner side of strap 25 to the interior of the air gap end of voltage magnet pole piece 15. The hollow rivet 36 may be of magnetic material and this arrangement brings the magnetic potential of block 31 substantially to that of the central leg of the voltage magnet. Owing to the fact that the flux between block 31 and voltage magnet pole piece 15 cuts the turned-up edge of the lag plate 22 of conducting material and the conductor strip 29, if present, and threads the unlaminated magnetic parts 35, 25, and 31, the flux from the auxiliary pole piece 31 lags somewhat behind the flux of main pole piece 15. The relatively small percentage of the voltage flux thus diverted and lagged remains substantially fixed and may be shifted to cause induction meter torque in either direction of disk rotation.

Threaded shaft 28 is provided with two integral collars 37 and 38. A stiff spring 39 is compressed between collar 37 and a washer 40 which rests against the side of bearing 27. The threaded shaft 28 is thus firmly held against endwise displacement, and the structure firmly holds the auxiliary pole piece 31 in any position to which adjusted but may be moved a considerable distance either side of the center position shown in Fig. 2 by turning the shaft 28. Also this entire light load adjustment mechanism is rigidly clamped to the driving magnet structure and cannot move with respect thereto except as intentionally adjusted as above described.

Over the range of adjustment of block 31 the magnetic strap 25 along which it slides is preferably cut away on the air gap side as shown at 40, Fig. 3, which increases the amount of flux which is carried out through the auxiliary pole piece block 31 from the main voltage pole 15. It is seen that the lower surface of this auxiliary pole piece does not protrude into the gap below voltage pole 15 nor does any part of strap 25. Block 31 extends out over the overload compensating magnetic shunt 41 which is generally located at the side of and between the tips of pole pieces 16 and 17 of the current magnet on the opposite side of the armature from such auxiliary pole piece 31. The flux from such auxiliary pole piece 31 thus largely passes through the armature and enters the lower current electromagnet through the overload compensating shunt 41, as represented in dotted lines, Fig. 4, and returns to the voltage magnet through the outer yoke parts 18, and the particular path traversed by such flux will depend upon the adjusted position of the block pole piece 31. While I thus utilize the overload shunt 41, my invention is not limited to meters with such shunts. For the central position of the block shown in Fig. 2, the light load adjusting flux will divide symmetrically through the current pole pieces 16 and 17 and the outer yoke parts 18. For the position of adjustment shown in Fig. 3, this light load adjusting flux will pass mostly through pole 15 and the left yoke, as represented by the dotted line path 42, Fig. 3. By shifting the block 31 to the right of the midposition, such flux would pass largely through pole piece 17 and the right-hand yoke part 18. The arrangement is such that the distribution of such auxiliary flux through the two paths mentioned can be very accurately and exactly proportioned to any desired ratio by adjusting the position of block 31.

The normal direction of rotation of the main induction motor of the meter is counterclockwise, looking down on the armature as represented by the arrow 43, Fig. 1. The direction of torque produced by the main voltage flux and the auxiliary or light load voltage flux acting as main and shaded poles, respectively, depends upon the position of the auxiliary shaded pole 31. For the central position shown in Fig. 1, the light load shaded pole flux produces no torque. For the position shown in Fig. 3, its torque is added to the wattmeter torque and if the block 31 were moved to the right of center, its torque would be opposed to the wattmeter torque. The direction and magnitude of the light load adjustment torque for various positions of block 31 over the adjustment range are represented in Fig. 5 where the ordinates for curve A represent percentage meter error slow or fast, and the abscissa represents displacement of block 31, using as displacement units the revolutions of a shaft 28 having 32 threads per inch and starting from the 20 per cent fast adjustment position. In the example given the displacement range of adjustment is $20/32$ or $5/8$ of an inch, or $5/16$ of an inch each way from center.

Curve A represents the change in light load torque as a function of the displacement of the block where the torque on the meter in the central position of the block is 10 per cent of the rated full load torque and the only change made is the shifting of the block. It is seen that by such adjustment the light load speed of the meter may be varied over a range of from about 20 per cent fast to 20 per cent slow, and that the adjustment is a true light load adjustment. This adjustment does not affect the lag adjustment for any position of the block and, moreover, placing the light load adjustment features, 31 and 34 on the meter or removing them entirely does not affect the lag adjustment. Changing the position of block 31 does not increase or decrease the meter voltage flux and, therefore, has a minimum influence on the full load adjustment. It is easily adjusted and is stable in any position of adjustment.

In accordance with the provisions of the Patent Statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An induction meter comprising a rotary disk of conducting material, an E-shaped voltage magnet with its pole pieces facing the disk, a voltage coil on the central leg of said magnet, a U-shaped current magnet on the opposite side of said disk with its pole pieces facing the disk opposite the voltage magnet, said magnets cooperating to produce driving torque fluxes in the disk, a light load adjustment for said meter comprising a strap of magnetic material secured in fixed relation along a side of the voltage magnet adjacent the disk and magnetically connected only with the central leg thereof, and a block of magnetic material slidably mounted along said strap beyond the limits of the voltage magnet core and comprising an auxiliary voltage flux pole piece and diverting a substantially fixed percentage of the flux from the central leg of said voltage magnet into the disk at a point along a tangent to the radius of the disk which point is adjustable, means for causing lagging of such diverted flux whereby a shaded pole induction motor torque is produced in the disk by the voltage flux, the direction and magnitude of which may be adjusted by adjusting the position of said auxiliary pole piece.

2. An induction meter comprising an E-shaped voltage magnet and a U-shaped current magnet having their pole pieces facing each other across an air gap, a disk of conducting material mounted for rotation through said gap so as to be driven by the fluxes of said magnets, a saturable overload compensating magnet shunt between the pole tip of the current magnet along one side of the current magnet adjacent the disk, and light load adjusting means for said meter comprising a strap of magnetic material secured in fixed relation along a side of the voltage magnet adjacent the disk and magnetically connected only with the central leg of the voltage magnet and an auxiliary voltage flux pole piece which is slidably adjustable along said strap adjacent the disk opposite to said overload compensating shunt for diverting a substantially fixed small percentage of the flux from the central pole piece of said voltage magnet through the disk and into said overload current shunt, and means for lagging such diverted flux relative to the main voltage flux of such central pole piece, said auxiliary pole piece being adjustable in a direction tangent to a radius of the disk between positions where it may produce torque in either direction of rotation of said disk.

3. In a watthour meter of the induction type having a rotary disk armature of conducting material and an E-shaped voltage magnet with its pole pieces facing the armature, light load adjusting means comprising a U-shaped strap of magnetic material with its yoke rigidly secured to the side of the voltage magnet adjacent and tangent to the disk and magnetically connected to only the central pole piece of the voltage magnet through a flux lagging path, and with its legs extending away from the magnet, a nonmagnetic threaded shaft having bearings in the legs of said U-shaped strap and a magnetic nut threaded on said rod and urged thereby against the face of said strap whereby the position of said magnetic nut may be adjusted along said strap adjacent said disk and tangent to a radius of the disk to comprise an auxiliary voltage magnet pole piece and producing a light load torque which is adjustable, the yoke of said strap being undercut adjacent the disk to reduce flux leakage therefrom into the disk.

4. In a watthour meter of the induction type, an E-shaped voltage magnet and a disk armature of conducting material rotatively mounted opposite the pole faces of said E-shaped voltage magnet, a light load adjustment for said meter comprising a strap of magnetic material rigidly secured to a side of the voltage magnet adjacent and parallel to the armature and tangent to a radius of the armature, said strap being magnetically connected to only the central pole piece of the E-shaped voltage magnet, a block of magnetic material tightly pressed against the outer face of said strap and forming an auxiliary voltage flux pole piece, means for adjusting the position of said block along said strap for the purpose of meter light load adjustment, a lag plate for said meter extending between the voltage magnet and armature and having a turned-up edge which is secured between said voltage magnet and magnetic strap and serving also to lag the voltage flux of said auxiliary adjustable pole piece.

LEWIS I. MENDELSOHN.